United States Patent [19]
Kume et al.

[11] Patent Number: 5,181,195
[45] Date of Patent: Jan. 19, 1993

[54] TRACKING ERROR SIGNAL GENERATOR WITH DC OFFSET CANCELLATION

[75] Inventors: Hidehiro Kume, Tokyo; Etsufumi Yamamoto, Kanagawa, both of Japan

[73] Assignee: Sony Corporation, Tokyo, Japan

[21] Appl. No.: 700,866

[22] Filed: May 16, 1991

[30] Foreign Application Priority Data

May 18, 1990 [JP] Japan .................................. 2-126587

[51] Int. Cl.⁵ .............................................. G11B 7/00
[52] U.S. Cl. .............................. 369/44.41; 369/44.34
[58] Field of Search ............... 369/44.41, 44.42, 44.33, 369/44.34, 44.25, 44.27-44.29, 124, 44.32; 250/201.5; 360/67

[56] References Cited

U.S. PATENT DOCUMENTS

| | | | |
|---|---|---|---|
| 4,587,644 | 5/1986 | Fujiie | 369/44.32 |
| 4,589,103 | 5/1986 | Tajima | 369/44.34 |
| 4,786,990 | 11/1988 | Overton et al. | 360/67 |
| 4,849,953 | 7/1989 | Nomura et al. | 369/44.33 |
| 4,866,687 | 9/1989 | Kasai et al. | 369/30 |
| 4,998,234 | 3/1991 | Dees et al. | 369/44.41 |

FOREIGN PATENT DOCUMENTS

| | | |
|---|---|---|
| 035236 | 9/1981 | European Pat. Off. . |
| 324949 | 7/1989 | European Pat. Off. . |
| 328354 | 8/1989 | European Pat. Off. . |

OTHER PUBLICATIONS

Patent Abstracts of Japan, vol. 10, No. 188, (P-473) (2244) Jul. 3, 1986.
Patent Abstracts of Japan, vol. 10, No. 119 (P-453) (2176) May 6, 1986.
Patent Abstracts of Japan, vol. 10, No. 15 (P-422) (2072) Jan. 21, 1986.
Patent Abstracts of Japan, vol. 9, No. 182 (P-376) (1905) Jul. 27, 1985.

*Primary Examiner*—Aristotelis Psitos
*Assistant Examiner*—Thang V. Tran
*Attorney, Agent, or Firm*—Lewis H. Eslinger; Jay H. Maioli

[57] ABSTRACT

A tracking error signal generator for producing a tracking error signal by first detecting a light beam, which is irradiated from an optical pickup to an optical disc, by an optical detector so divided as to have two optical detecting portions in a direction of a recording track on the optical disc, and then controlling the light beam to follow the recording track on the optical disc in accordance with the detection outputs from the divided optical detector. The tracking error signal generator comprises first and second peak detecting means for detecting the respective peak values of detection output signals from the first and second optical detecting portions of the optical detector divided along the recording track on the optical disc, and arithmetic means for forming a difference signal between signals obtained by applying a coefficient smaller than 1 to multiply respectively the output signal of the first peak detecting means and the detection output of the first optical detecting portion, and signals obtained by applying a coefficient smaller than 1 to multiply respectively the output signal of the second peak detecting means and the detecting output of the second optical detecting portion.

4 Claims, 4 Drawing Sheets

TRACKING ERROR SIGNAL GENERATOR WITH DC OFFSET CANCELLATION

BACKGROUND OF THE INVENTION

1. Field of the Invention

The present invention relates to a tracking error signal generator for supplying a tracking error signal to a tracking servo circuit in an optical disc recording and-/or playback apparatus which records data on or reproduces the same from an optical disc with irradiation of a laser beam thereto.

2. Description of the Prior Art

Relative to tracking servo control in reproduction of data recorded on an optical recording medium such as an optical disc, there are known a push-pull type (as disclosed in U.S. Pat. No. 4,809,427 and Japanese Patent Publication No. Sho 62 (1987)-18975) and a three-spot type (as disclosed in U.S. Pat. No. 3,876,842) where a light beam emitted from a laser light source of an optical pickup is so controlled as to follow a track formed on the optical disc. Out of such techniques, the push-pull type tracking control is frequently employed in an optical disc recording and/or playback apparatus since an optical system of its pickup is structurally simpler than that in the three-spot type tracking control.

In such push-pull type tracking control, there occurs a positional displacement of a beam spot on a photo detector of the optical pickup when any skew is existent on an optical recording medium such as an optical disc in a direction orthogonal to a recording track or when an objective lens in the optical pickup is moved for tracking control.

More specifically, in execution of such push-pull type tracking control, the photo detector of the optical pickup is divided to have first and second light receiving portions A and B as illustrated in FIG. 1, and the return light reflected from the optical disc is detected by the photo detector, so that a tracking error signal is obtained on the basis of the difference between the output signals from such two optical receiving portions A and B. According to a push-pull type tracking controller shown in FIG. 1, the beam spot S is deviated on the optical receiving portions of the photo detector as represented by a dotted line due to a skew of the optical disc or a displacement of the objective lens. With a movement of the beam spot S on the optical receiving portion of the optical detector, the amount of such movement thereon forms a DC component which comes to be included as a DC offset in the tracking error signal. Consequently it becomes impossible to execute exact tracking servo control by the use of such tracking error signal.

For the purpose of solving the problems mentioned, there is known an improved circuit as disclosed in Japanese Patent Laid-open No. Sho 60 (1985)-52936, wherein a difference signal between the respective peak values of the output signals of first and second photo detectors is subtracted from difference signals between the respective absolute values of the output signals of the first and second photo detectors, i.e., from a difference signal between the peak value and the bottom value of the output signal of the first photo detector, and a difference signal between the peak value and the bottom value of the output signal of the second photo detector, hence producing a tracking error signal with removal of the DC component therefrom.

If there exists any flaw or the like on an optical recording medium such as an optical disc, the intensity of the light beam reflected from such recording medium is sharply reduced in general at the position with the flaw and, when the reflected beam intensity is thus reduced, a decrease in the peak value of the output signal obtained from the photo detector becomes greater than a decrease in the bottom value thereof.

However, in the tracking error signal generator circuit disclosed in Japanese Patent Laid-open No. Sho 60 (1985)-52936 mentioned above, the tracking error signal with the DC component removed therefrom is produced by subtracting the difference signal between the respective peak values from the difference signals between the respective absolute values of the output signals obtained from first and second optical detecting portions.

Therefore, even after removal of sharp variations in the peak values, the peak value information is still included in the absolute value itself, and it is difficult to attain an accurate tracking error signal which is not harmfully affected by the flaw and so forth on the optical recording medium.

And if the circuit is so formed as to remove even the sharp variations of the absolute value including the peak value information, there arises another problem that some difficulties are unavoidable in attaining a tracking error signal of a wide frequency band with high response characteristics.

In view of the above problems, the present applicant proposed another improvement disclosed in Japanese Utility Model Laid-open No. Sho 62 (1987)26620. According to such improvement of a push-pull type, the respective peak values and bottom values of detection signals outputted from two detectors are processed independently of each other, and a desired tracking error signal is produced by subtracting the difference signal between the two peak values from the difference signal between the two bottom values which principally represent the tracking state.

However, according to the tracking error signal generator circuit in the above improvement, a tracking error signal is produced principally from the signals which are holding the bottom values, so that the circuit configuration becomes complicated with another problem that, if any pit information is defective in a so-called compact disc produced by recording information signal on an optical disc as an optical recording medium, the error signal is dominantly affected by such defect.

OBJECT AND SUMMARY OF THE INVENTION

It is therefore an object of the present invention to provide an improved tracking error signal generator which comprises a circuit for producing peak values of output signals detected from a two-divided detector by a push-pull system, and a circuit for detecting a tracking error signal from the difference between such detection signals, so as to remove, from the output of the peak value producing circuit, the DC offset component derived from a displacement or skew of a beam spot.

Furthermore, the signal obtained through detection of the difference between the peak values is multiplied by a predetermined coefficient to achieve enhanced effective removal of the DC offset component.

There occur variations in the respective peak values of the detection signals outputted from the divided detector, and the offset component caused in the tracking error signal due to the beam spot deviation or the like is changed depending on the pit shape in each disc and the reflectivity of the signal recording portion. In such a state, a predetermined coefficient is applied to multiply the offset signal obtained by calculating the peak values, hence producing a more accurate tracking error signal.

The above and other features and advantages of the present invention will become apparent from the following description which will be given with reference to the illustrative accompanying drawings.

DESCRIPTION OF THE PREFERRED EMBODIMENTS

Hereinafter exemplary embodiments of the present invention will be described in detail with reference to the accompanying drawings.

Figure 1:
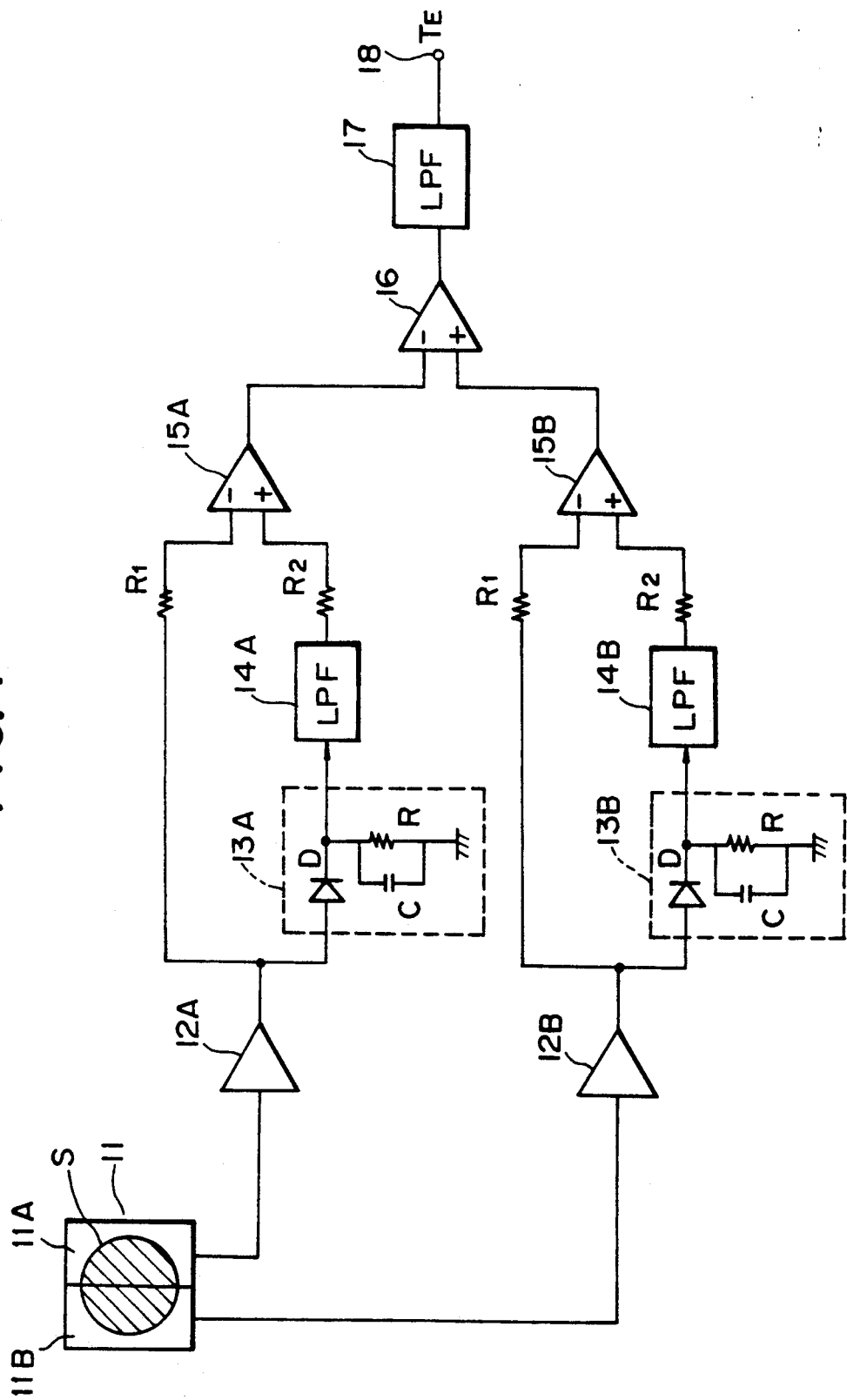
FIG. 1 is a circuit block diagram of a tracking error signal generator representing a first embodiment of the present invention.

FIG. 1 is a circuit block diagram of a tracking error signal generator representing a first embodiment of the present invention. This embodiment comprises a photo detector 11 having two optical receiving portions 11A, 11B divided correspondingly to the recording track direction on an optical recording medium (hereinafter referred to as an optical disc); amplifiers 12A, 12B; peak detecting circuits 13A, 13B each consisting of a diode D and a time constant CR; low-pass filters 14A, 14B; first and second subtracters 15A, 15B; a third subtracter 16; a low-pass filter 17; and an output terminal 18.

The photo detector 11 is attached to an optical pickup (not shown) together with optical elements inclusive of a laser beam source, an electromagnetic actuator for driving an objective lens in the focusing direction or the tracking direction, a beam splitter and so forth. And the recording track is formed on the optical disc either concentrically or spirally.

A light beam emitted from an laser beam source (not shown) of an optical pickup such as a semiconductor laser element is irradiated in such a manner as to be focused by an objective lens on the signal recording portion of the optical disc, and then the light beam reflected from the optical disc is incident upon the photo detector 11 through the objective lens. The objective lens is so held as to be shiftable in both the focusing direction parallel with the optical axis and the tracking direction orthogonal to the focusing direction, and is driven by the actuator in such two directions in accordance with a focusing error signal and a tracking error signal. And when the light beam emitted from the laser beam source and received via an objective lens is at the center of the recording track on the optical disc, signals outputted from the optical receiving portions 11A, 11B have the same level and therefore the tracking error signal outputted from the low-pass filter 17 via the third subtracter is rendered zero at the output terminal 18.

However, if the light beam is positionally deviated from the center of the recording track, the amount of reflection from the mirror plane is increased with respect to one optical receiving portion 11A for example to consequently increase the amount of the incident light thereon, while the amount of the incident light on the other optical receiving portion 11B is decreased to the contrary.

Figure 2:
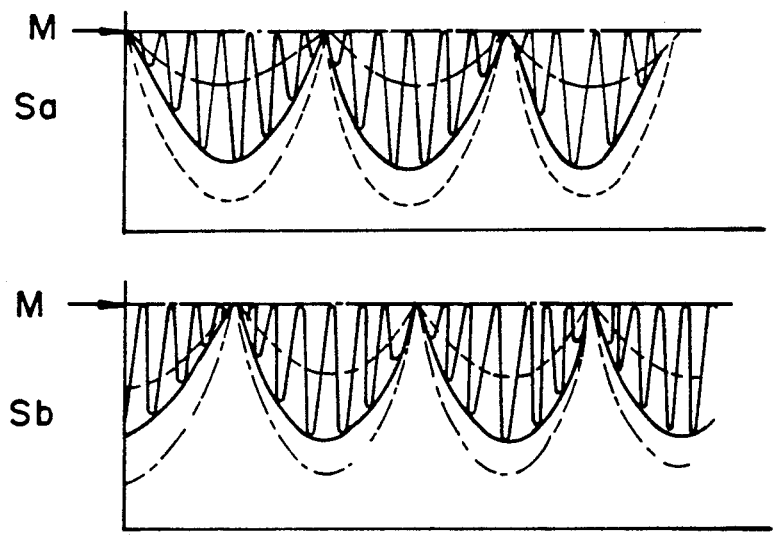
FIGS. 2 and 3 are waveform charts of signals obtained from a photo detector.

Accordingly, when the light beam is traversing the recording track, i.e., when the optical pickup or the light beam is moving in the radial direction of the optical disc, there occurs no change in the peak value (reflected light beam from the mirror plane) of a signal Sa relative to the optical receiving portion 11A and that of a signal Sb relative to the light receiving portion 11B as illustrated in FIG. 2, but the envelopes of RF signals obtained by detection of pits are changed with complementary increase and decreases depending on the direction of the deviation from the center of the recording track, as represented by a dotted line and a one-dot chained line.

It follows therefore that a signal obtained by subtracting the envelopes of such RF signals from each other serves as a tracking error signal.

Figure 3:
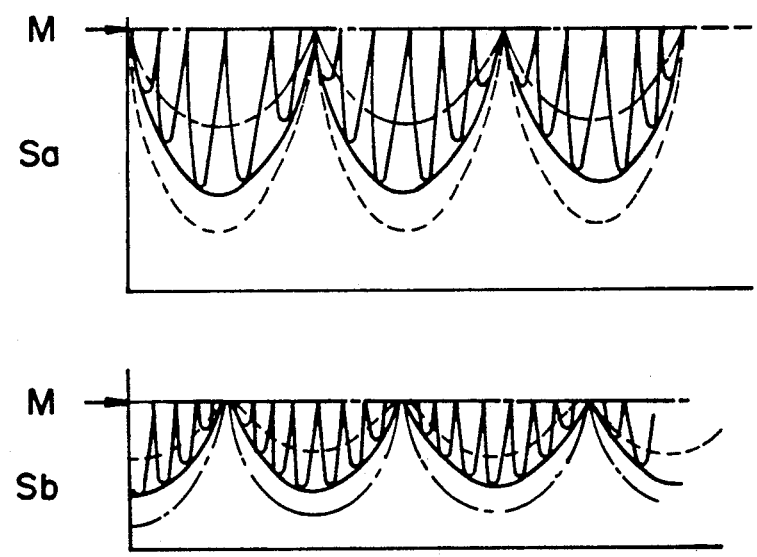

However, due to the deviation of the optical axis of the light beam derived from a displacement of an objective lens, the beam spot S being incident upon the photo detector 11 is positionally deviated to cause an imbalance between the amounts of incident light on the optical receiving portions 11A and 11B. In such a case, as illustrated in FIG. 3, the peak value level M of the detection signal Sa outputted from the optical receiving portion 11A for example is raised while the peak value level of the signal Sb from the optical receiving portion 11B is lowered.

As a result, the DC component corresponding to the level difference between the peak values is superposed on the output of the third subtracter 16 which produces a tracking error signal in FIG. 1, so that the tracking error signal fails to become zero at the on-track point with regard to the recording track.

In the circuit configuration of FIG. 1, the peak values of the detection signals Sa, Sb are detected by the peak detector circuits 13A, 13B respectively, and the peak values thus obtained are supplied via the low-pass filters 14A, 14B respectively to the first and second subtracters 15A, 15B so as to be subtracted from the envelope levels of the RF signals, whereby the DC offset components included in the outputs of the first and second subtracters are removed. The output signals from the subtracters 15A, 15B are then supplied to the third subtracter 16 where a desired tracking error signal is produced. Consequently the third subtracter 16 provides a satisfactory tracking error signal from which the DC offset components have been removed. The tracking error signal obtained from the output terminal 18 is supplied to the aforementioned pickup actuator via a phase compensating circuit and so forth, whereby tracking control is executed to shift the objective lens in the radial direction of the optical disc.

However, there exists a problem that the levels of the offset signals obtained from the optical receiving portions 11A, 11B are not equal to the levels of the offset signals obtained as the RF signal levels.

Figure 4:
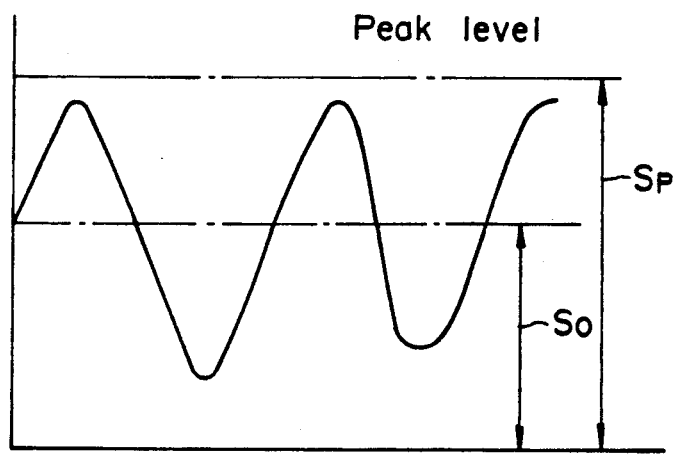
FIG. 4 is an explanatory diagram of RF signals and peak levels thereof.

The peak level Sp of the detecting signal and the offset level So of the RF signal have a relationship of So/Sp<1 as shown in FIG. 4, and the offset level So of the RF signal is affected by the pit shape in the optical disc and the reflectivity of the signal recording portion.

Figure 5:
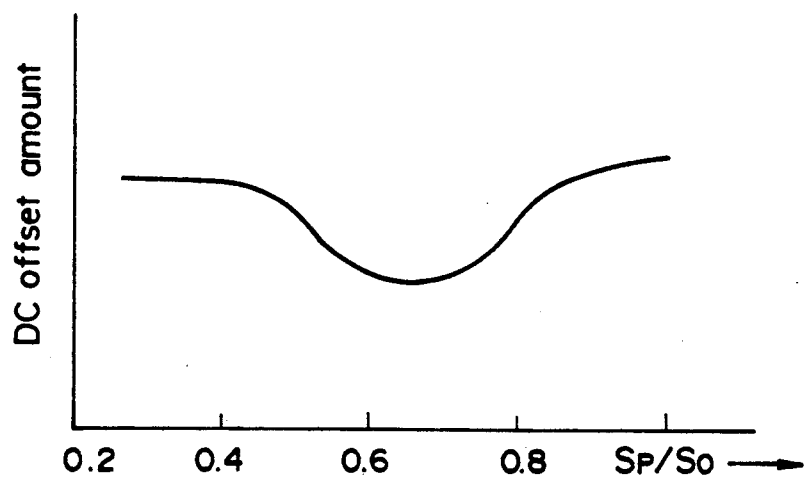
FIG. 5 graphically shows the relationship between a DC offset and a coefficient.

It is therefore necessary to take the ratio So/Sp into consideration in determining the amount of cancellation applied the offset signal. According to the experimental result achieved by the present inventor, it has been confirmed that the offset amount of the push-pull signal is reduced under specified conditions as graphically shown in FIG. 5 where the ratio So/Sp is in a range of 0.5 to 0.8.

On the basis of such result, the peak level to be subtracted from the envelope of the RF signal in the embodiment of FIG. 1 is determined by selectively setting R1/R2, which is the ratio of the resistance values R1 and R2, within a range of 0.5 to 0.8 so as to achieve effective removal of the DC component from the tracking error signal.

Although the above coefficient is different depending on the pit shape in each optical disc or the pit modulation system, it is preferred that the average value be within a range of 0.5 to 0.8.

Figure 6:
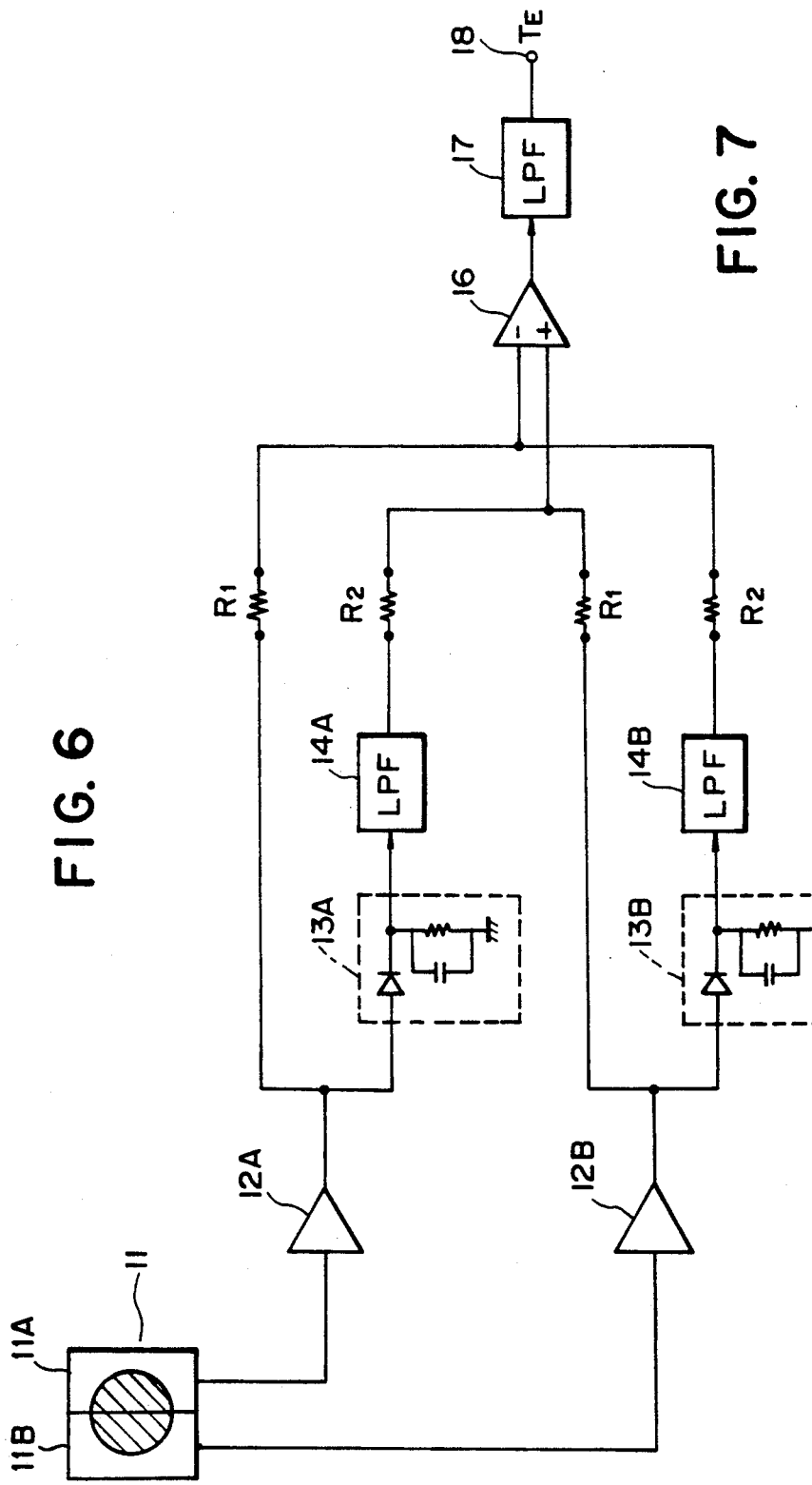
FIG. 6 is a circuit block diagram of a tracking error signal generator representing a second embodiment of the present invention.
Figure 7:
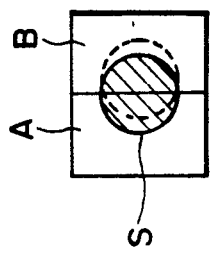
FIG. 7 is an explanatory diagram of a push-pull type photo detector.

FIG. 6 is a circuit block diagram of a second embodiment according to the present invention, where the same reference numerals and symbols as those used in FIG. 1 denote the same or corresponding component parts, and a repeated explanation thereof is omitted here.

In the second embodiment, the first and second subtracters 15A, 15B are eliminated, and subtractions of both the peak values and the envelopes of the RF signals are performed by the third subtracter 16 alone to attain an advantage of further simplifying the circuit configuration.

The resistors R1 and R2 serve to set the coefficient used for multiplying the peak values, and it is preferred that the ratio R1/R2 be within a range of 0.5 to 0.8 as in the foregoing embodiment of FIG. 1.

As described hereinabove, the tracking error signal generator of the present invention is equipped with peak detectors for holding the respective peak values of detection signals obtained from a divided photo detector, and also with a means for producing a difference signal between the envelopes of the RF detection signals. And in detecting the tracking error by push-pull servo control, the DC offset signal derived from any positional deviation of the optical axis of the objective lens can be removed by a simplified circuit to consequently minimize the harmful influence from any defect in pit information.

Furthermore, the peak value for canceling the DC offset is multiplied by a predetermined coefficient to execute required subtraction, hence attaining another advantage of effectively removing the DC offset.

What is claimed is:

1. A tracking error signal generator comprising:
   a photo detector means having first and second optical detecting portions divided in a direction corresponding to a recording track on an optical recording medium, so as to receive a return light beam reflected from said optical recording medium;
   first and second peak detecting means for detecting respective peak values of detection output signals obtained from said first and second optical detecting portions; and
   arithmetic means for forming a difference signal between signals obtained by respectively multiplying an output signal of said first peak detecting means and the detection output of said first optical detecting portion by coefficient values less than 1.0, and signals obtained by respectively multiplying an output signal of said second peak detecting means and the detection output of said second optical detecting portion by the coefficient values less than 1.0.

2. A tracking error signal generator according to claim 1, wherein said arithmetic means comprises first subtractor means for calculating a difference between the signals obtained by respectively multiplying the output signal of said first peak detecting means and the detection output of said first optical detecting portion by the coefficient values less than 1.0; second subtractor means for calculating a difference between the signals obtained by respectively multiplying the output signal of said second peak detecting means and the detection output of said second optical detecting portion; by the coefficient values less than 1.0 and third subtractor means for calculating a difference between the output signal of said first subtractor means and the output signal of said second subtractor means.

3. A tracking error signal generator according to claim 1, wherein said coefficient values less than 1.0 are within a range of 0.5 to 0.8.

4. A tracking error signal generator according to claim 1, wherein said arithmetic means comprises a subtractor for calculating a difference between the signals obtained by respectively multiplying the detection output of said first optical detecting portion and the output signal of said second peak detecting means by the coefficient values less than 1.0, and the signals obtained by respectively multiplying the detection output of said second optical detecting portion and the output signal of said first peak detecting means by the coefficient values less than 1.0.

* * * * *

UNITED STATES PATENT AND TRADEMARK OFFICE
CERTIFICATE OF CORRECTION

PATENT NO. : 5,181,195
DATED : Jan. 19, 1993
INVENTOR(S) : Kume et al.

It is certified that error appears in the above-identified patent and that said Letters Patent is hereby corrected as shown below:

```
Col. 4, line 20, change "increase" to --increases--

Col. 6, line 26, change "subtractor" to --subtracter--
       line 30, change "subtractor" to --subtracter--
       line 35, change "subtractor" to --subtracter--
       line 37, change "subtractor" to --subtracter--
       line 38, change "subtractor" to --subtracter--
       line 44, change "subtractor" to --subtracter--
```

Signed and Sealed this

Eighth Day of March, 1994

*Attest:*

BRUCE LEHMAN

*Attesting Officer*     *Commissioner of Patents and Trademarks*